(12) United States Patent
Koike et al.

(10) Patent No.: US 10,272,808 B2
(45) Date of Patent: Apr. 30, 2019

(54) SEAT BELT DEVICE FOR THE VEHICLE SEAT

(71) Applicant: TACHI-S Co., LTD., Akishima-Shi, Tokyo (JP)

(72) Inventors: Atsushi Koike, Ome (JP); Tomohiro Amano, Ome (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 15/662,846

(22) Filed: Jul. 28, 2017

(65) Prior Publication Data

US 2017/0327019 A1 Nov. 16, 2017

Related U.S. Application Data

(62) Division of application No. 14/728,148, filed on Jun. 2, 2015.

(30) Foreign Application Priority Data

Jun. 3, 2014 (JP) ................................ 2014-114543

(51) Int. Cl.
*B60R 22/00* (2006.01)
*B60N 2/68* (2006.01)
(Continued)

(52) U.S. Cl.
CPC ............... *B60N 2/688* (2013.01); *B60N 2/64* (2013.01); *B60R 22/024* (2013.01); *B60R 22/12* (2013.01);
(Continued)

(58) Field of Classification Search
CPC ........ B60N 2/688; B60N 2/64; B60R 22/024; B60R 22/12; B60R 22/26; B60R 22/00
(Continued)

(56) References Cited

U.S. PATENT DOCUMENTS 4,635,963 A * 1/1987 Higuchi .................. B60R 22/03
280/801.1
4,817,754 A * 4/1989 Muramoto ............ B60R 22/023
180/268

(Continued)

FOREIGN PATENT DOCUMENTS

DE 19901784 A1 8/1999
DE 202007009815 U1 10/2007
(Continued)

OTHER PUBLICATIONS

USPTO Non-Final Office Action corresponding to U.S. Appl. No. 14/728,148; dated Aug. 10, 2017.
(Continued)

*Primary Examiner* — Syed A Islam
(74) *Attorney, Agent, or Firm* — Cantor Colburn LLP

(57) ABSTRACT

An upper-front of a seatback is cut, providing a hole at a position the occupant's shoulder may lie, and an engaging means able to engage with a shoulder webbing is fitted in the hole. The engaging means holds the shoulder webbing, which is wrapped around the occupant. The engaging means is, for example, a (second) buckle fitted in the hole. A second tongue (intermediate tongue) is mounted on a middle part of the shoulder webbing. The shoulder webbing is wrapped slantwise around the occupant's shoulder when the second tongue is engaged with the second buckle.

14 Claims, 7 Drawing Sheets

(51) Int. Cl.
*B60R 22/12* (2006.01)
*B60N 2/64* (2006.01)
*B60R 22/02* (2006.01)
*B60R 22/26* (2006.01)
*B60R 22/18* (2006.01)

(52) U.S. Cl.
CPC ...... *B60R 22/26* (2013.01); *B60R 2022/1806* (2013.01); *B60R 2022/1818* (2013.01)

(58) Field of Classification Search
USPC .............................. 297/468; 280/808, 801.1
See application file for complete search history.

(56) References Cited

U.S. PATENT DOCUMENTS

| | | | | |
|---|---|---|---|---|
| 4,832,366 | A * | 5/1989 | Corbett | B60R 22/024 280/808 |
| 5,263,741 | A * | 11/1993 | Seros | B60R 22/024 280/808 |
| 5,716,073 | A * | 2/1998 | Redman | B60R 22/26 280/801.1 |
| 6,336,662 | B1 * | 1/2002 | Kurita | B60N 2/3011 280/801.1 |
| 6,846,020 | B2 * | 1/2005 | Xu | B60R 22/20 280/801.1 |
| 2004/0061323 | A1 | 4/2004 | Xu | |
| 2004/0140660 | A1 | 7/2004 | Xu | |
| 2008/0100122 | A1 * | 5/2008 | Bell | B60N 2/688 297/468 |
| 2008/0211278 | A1 * | 9/2008 | Macliver | B60N 2/2812 297/250.1 |
| 2013/0009440 | A1 | 1/2013 | Majima et al. | |

FOREIGN PATENT DOCUMENTS

| | | |
|---|---|---|
| EP | 0254260 A1 | 1/1988 |
| EP | 1897766 A2 | 3/2008 |
| GB | 2249254 A | 5/1992 |
| GB | 2334240 A | 8/1999 |
| JP | 05112204 A | 5/1993 |
| JP | 3135615 A | 9/2007 |
| JP | 2010058723 A | 3/2010 |
| JP | 2010173358 A | 8/2010 |
| JP | 2011162163 A | 8/2011 |
| WO | 2007107881 A1 | 9/2007 |

OTHER PUBLICATIONS

Notification of Reasons for Refusal for corresponding Japan Patent Application No. 2014-114543; dated Jan. 22, 2018.
European Communication pursuant to Article 94(3) EPC corresponding to Application No. 15168445.3-1503; dated Aug. 24, 2016.
Extended European Search Report corresponding to Application No. 15168445.3-1503; dated Sep. 16, 2015.

* cited by examiner

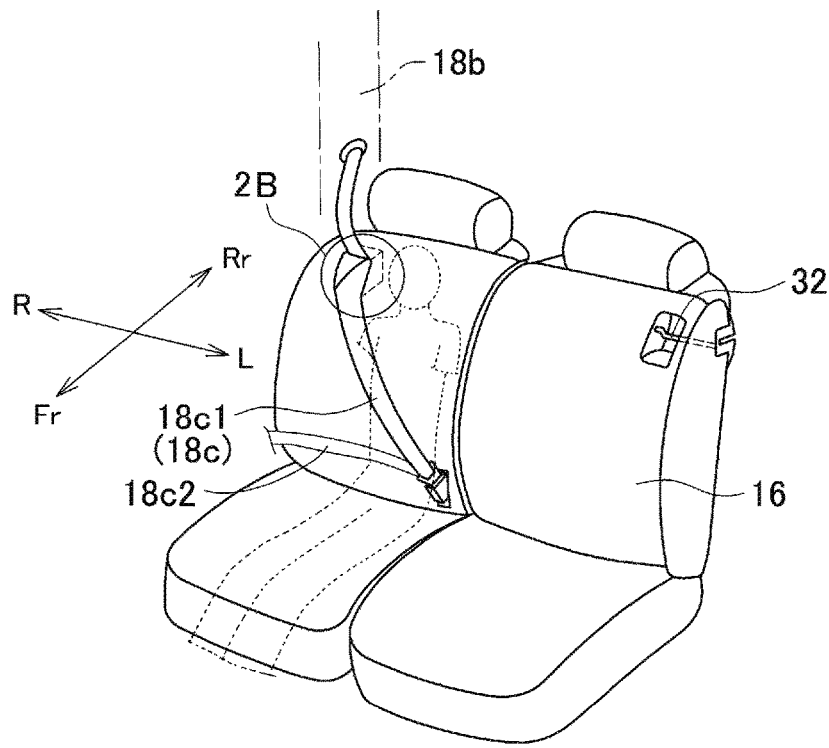
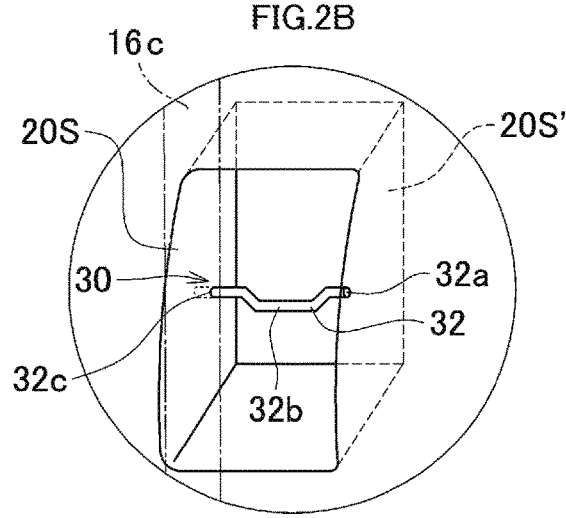
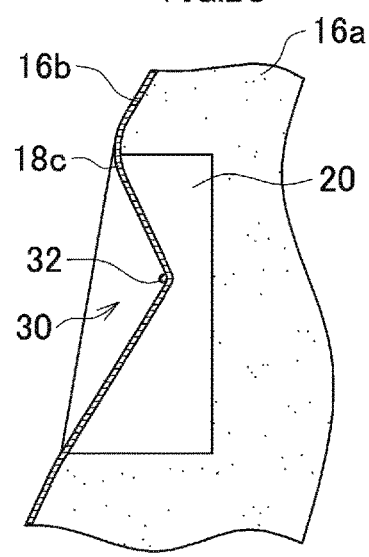

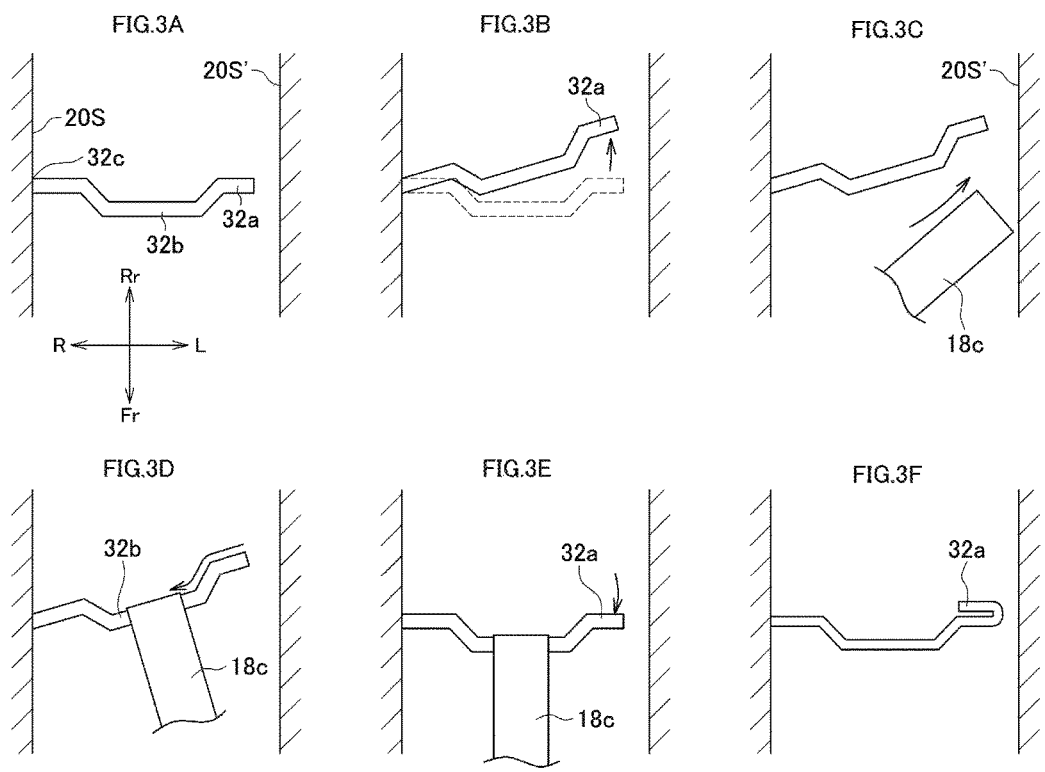

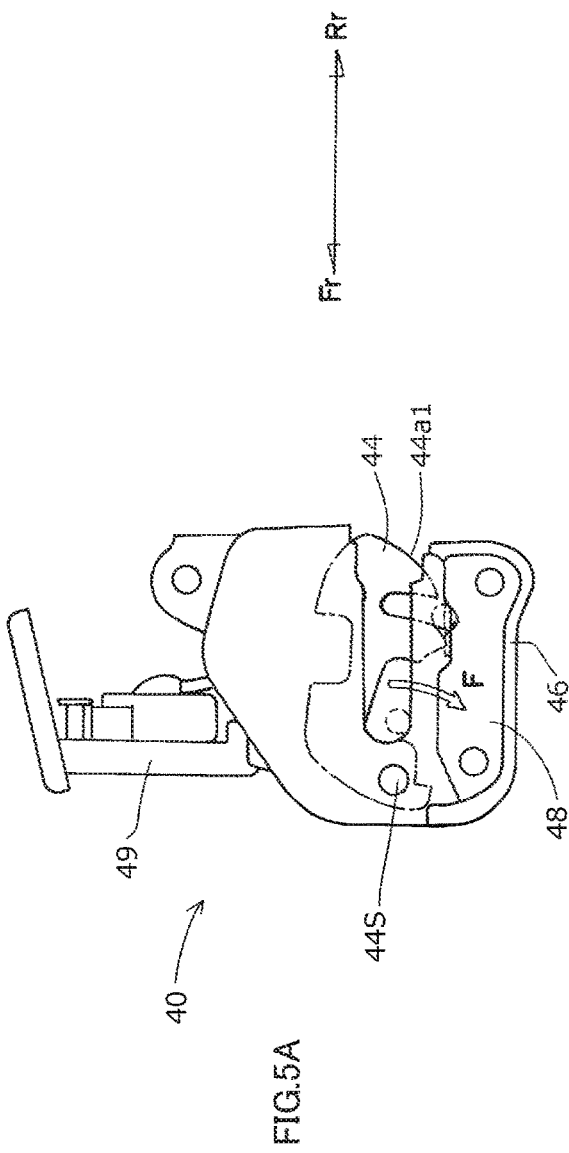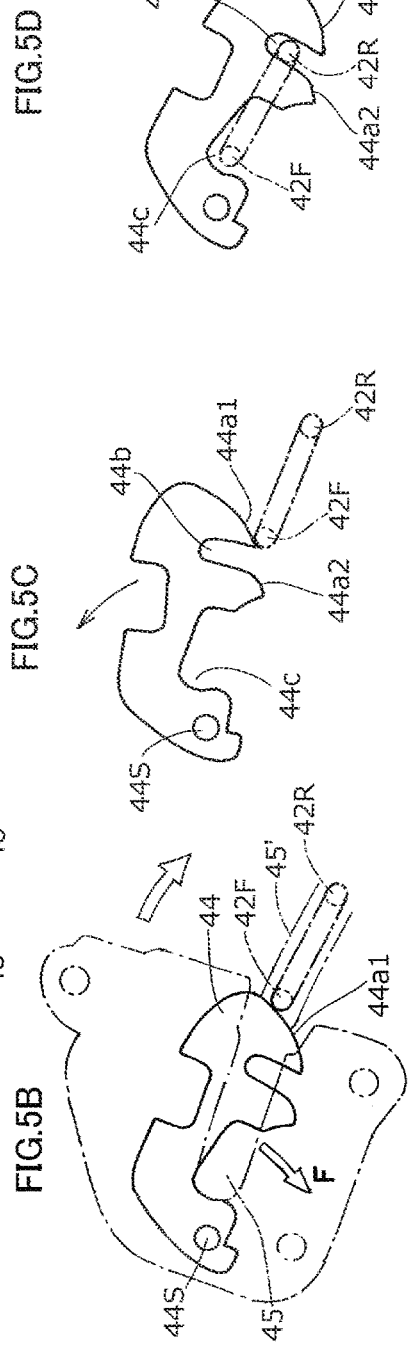

SEAT BELT DEVICE FOR THE VEHICLE SEAT

CROSS-REFERENCE TO RELATED APPLICATIONS

The present application is a divisional application of U.S. patent application Ser. No. 14/728,148 filed on Jun. 2, 2015, the entire contents of which are incorporated herein by reference. The Ser. No. 14/728,148 application claimed the benefit of the date of the earlier filed Japanese Patent Applications No. 2014-114543, filed on Jun. 3, 2014, priority to which is also claimed herein, and the contents of which are also incorporated herein by reference herein.

BACKGROUND OF THE INVENTION

Field of the Invention

This invention relates to a seat belt device for the vehicle seat, which is designed to hold an occupant to the vehicle seat.

Description of the Related Art

As a seat belt device for holding an occupant to a vehicle seat, the three-point holding seat belt is broadly used to hold the occupant to the vehicle seat, at three points, i.e., the left or right shoulder and the left and right hips.

The three-point holding seat belt (or three-point seat belt) comprise webbing. The webbing is taken up as a pulling force is applied to it from the retractor incorporated in, for example, a chassis pillar. The webbing extends from the retractor, through the webbing feed port made in the pillar provided on the chassis wall and located above the upper end of the vehicle seat. The occupant may hold, with hand, the tongue mounted on the webbing and insert the tongue into the buckle provided on one side of the seat cushion. The upper half of the webbing used as a shoulder webbing is thereby wrapped around the occupant, slantwise from one shoulder, and the lower half of the webbing used as a wrap webbing is wrapped around the hips. As a result, the seat belt holds the occupant to the vehicle seat.

Recently, not only the occupant of a front seat, but also the occupant of a rear seat is obligated to wear a seat belt.

If a vehicle is abruptly decelerated or stopped or if it collides with the vehicle running before, an inertial force acts on any occupant wearing the seat belt, to move the occupant forwards. Usually, the occupant is prevented from moving forwards due to the inertial force acting in such an emergency as the retractor tightens the webbing of the seat belt. As is pointed out, however, the seat belt may fail to function effectively if the occupant undergoes a so-called submarine phenomenon, i.e., forward motion with his or her buttocks sinking in the seat cushion.

Most three-point holding seat belts are designed to hold adults of ordinary physique. Hence, if a small adult or a child wears the three-point holding seat belt, the webbing feed port made in the pillar is located positioned much farther above the occupant's shoulder than in the case an adult of ordinary physique wears the three-point holding seat belt. Inevitably, the gap (hereinafter referred to as "gap") between the shoulder webbing extending from the webbing feed port and the occupant's shoulder and the seatback is relatively large. Even if the webbing is tightened at an emergency to reduce the gap immediately, the seat belt can hardly press the occupant's shoulders onto the vehicle seat (more precisely, seatback) to hold the occupant steadily.

A three-point holding seat belt designed to control effectively the submarine phenomenon a small occupant may undergo is known. (Refer to, for example, JP 2010-173358A, JP 05-112204A and JP 2010-058723A.)

In the invention of JP 2010-173358A, a first height adjusting mechanism is provided in a pillar, and a second height adjusting mechanism is provided on an upper part of that side of a seatback, which faces the pillar. The first and second height adjusting mechanisms adjust the height (position) of the upper end of the shoulder webbing extending from the occupant's shoulder, reducing the above-mentioned gap.

Each of the first and second height adjusting mechanisms is composed of a base member and a sliding member. The base member is shaped like a flat plate extending in vertical direction. The base member of the first and the second height adjusting mechanisms are secured, respectively to the wall of the pillar and that side of the seatback, which faces the pillar. The sliding members may slide up and down on the base members, respectively, and each can be locked at a given position (height) on the associated base member. The sliding member of the first height adjusting mechanism has a webbing guide hole. The sliding member of the second height adjusting mechanism has a hook for catching the webbing.

In order to wear the webbing, the occupant first adjusts the heights of the sliding members of the first and second height adjusting mechanisms, locking the sliding members, each at the given positions on the associated base member. Then, the occupant pulls the webbing from the webbing feed port made in the pillar, passes the webbing through the webbing guide hole of the first height adjusting mechanism and fastens the webbing extending through the webbing guide hole to the hook of the second height adjusting mechanism. Now extending through the first and second height adjusting mechanisms, the webbing extending slantwise from the occupant's shoulder is wrapped around the occupant's hips.

In the invention of JPH05-112204A, a guide anchor is provided on that upper part of the side of the seatback, which faces the pillar. The guide anchor has a webbing guide hole, through which the webbing passes, and can be moved on that upper part of the side of the seatback, to a given position (height), by means of an electric drive mechanism.

The shoulder webbing extending from the webbing feed port made in the pillar passes through the webbing guide hole of the guide anchor and is wrapped around the occupant's hips from the occupant's shoulder.

In the invention of JP 2010-058723A, a guide anchor is provided on the upper part of the back of the seatback, which opposes the pillar. The guide anchor has a main part and an arm part. The main part has a webbing guide hole for guiding the webbing. The arm part supports the main part from below. The arm part is coupled, at lower end, to a drive mechanism. The arm part can be swung around its lower end as the drive mechanism operates.

In normal state, the main part of the guide anchor is positioned at the upper edge of that side of seatback, which opposes the pillar. The shoulder webbing extends from the webbing feed port made in the pillar. Then, the shoulder webbing is guided through the webbing guide hole and wrapped around the occupant's shoulder. In emergency such as a side collision, the drive mechanism constituted by, for example, an inflator, operates, swinging the guide anchor to one side of the seatback from the upper edge of the seatback, which lies near the pillar.

In the configuration disclosed in JP 2010-173358A, the sliding member is changed in position with respect to the base members of the first and second height adjusting mechanisms. The upper end of the shoulder webbing extending to the occupant's shoulder is thereby adjusted in height (position), reducing the above-mentioned gap. In particular, the second height adjusting mechanisms may be used to adjust the position of the sliding member, allowing the webbing to extend from the occupant's side, not from above the occupant's shoulder. This narrows the gap.

The second height adjusting mechanism is, however, secured to the upper edge of the seatback, which lies near the pillar. Hence, even if the sliding member is adjusted in position in vertical direction with respect to the base member of the second height adjusting mechanism and the shoulder webbing is thereby extended, the shoulder webbing will be spaced from the occupant's shoulder if the occupant is small in physique. Inevitably, a gap (distance) extending in the widthwise direction of the vehicle seat is provided between the shoulder webbing and the occupant's shoulder. The gap is broader than in the case where the occupant has ordinary physique. The shoulder webbing cannot be tightened to hold the occupant in emergency, and can hardly control the submarine phenomenon.

In the configuration of JPH 05-112204A, the guide anchor is changed in position at an upper part of that side of a seatback. The height (position) of the upper end of the shoulder webbing extending to the occupant's shoulder is thereby adjusted, narrowing the gap.

To change the position of the guide anchor, however, an electric drive mechanism is indispensable. The use of this drive mechanism complicates the configuration.

In the configuration of JP 2010-058723A, the drive mechanism operates in emergency, rotating the main part of the guide anchor around the lower end of the arm part. The main part of the guide anchor therefore moves to the side of the seatback from the upper edge of the seatback, which lies near the pillar. The gap is thereby reduced.

However, the angle through which the guide anchor may rotate cannot be set in accordance with the occupant's physique. Hence, the seat belt may fail to hold well a small occupant in emergency. Further, an inflator, for example, must be used as drive mechanism to operate in emergency, the configuration is inevitably complicated. The drive mechanism fails to operate in emergency, the occupant cannot be held, and the submarine phenomenon may not be controlled.

An object of this invention is to provide a seat belt device for the vehicle seat, which has a simple configuration and which can hold an occupant to the vehicle seat in emergency and control the submarine phenomenon, even if the occupant is small in physique.

To achieve the above-mentioned object, the upper-front part of a seatback is cut, providing a hole at which the occupant's shoulder may lie, and an engaging means is fitted in the hole. The engaging means holds the shoulder webbing, which is wrapped around the occupant.

SUMMARY OF THE INVENTION

In at least an embodiment, a seat belt device for vehicle seats is comprised a webbing having a tongue and extending from a webbing feed port made in a pillar, when the tongue is inserted into a buckle provided on one side of a seat cushion, the upper half of the webbing used as a shoulder webbing is wrapped slantwise around the shoulder of the occupant sitting on the vehicle seat, and the lower half of the webbing used as a wrap webbing is wrapped around the hips of the occupant, thereby holding the occupant to the vehicle seat, wherein further comprising: a hole provided by cutting the seatback at an upper-front part and located at a position where the shoulder of the occupant lies, an engaging means fitted in the hole and able to engage with the shoulder webbing; and the shoulder webbing is engaged with the engaging means and then wrapped slantwise around the shoulder of the occupant; and a striker shaped as a cantilever provided in the hole and having a free end at an inner end, and the shoulder webbing is bent back, forming a bent part at the intermediated part and is substantially U-shaped, and is wrapped slantwise around the shoulder of the occupant, at the bent part engaged with the striker.

Since the engaging means is fitted in the hole located at the occupant's shoulder, a gap is scarcely provided between the shoulder webbing and the occupant's shoulder and seatback. The shoulder webbing can therefore be tightened in emergency, and can hold even an occupant of small physique to the vehicle seat, preventing the submarine phenomenon.

Further, it suffices to provide a hole in the upper-front part of the seatback and to arrange an engaging means in the hole. No drive mechanisms such as an electric mechanism or an inflator are necessary. This helps to simplify the configuration of the seat belt device. Moreover, since the engaging means lies within the hole made in the upper-front part of the seatback, it never touches the occupant's back and never prevents the occupant from smoothly sitting on the vehicle seat.

BRIEF DESCRIPTION OF THE DRAWINGS

FIG. 2A is a schematic perspective view of a vehicle seat comprising a seat belt device according to another embodiment (Embodiment 2) of the present invention, not showing the wrap webbing for simplicity of drawing;

FIG. 2B is a partly magnified view, showing part 2B illustrated in FIG. 2A, and not showing the shoulder webbing for simplicity of drawing;

FIG. 2C is a partly sectional view of the part 2B illustrated in FIG. 2A;

FIGS. 3A to 3E are schematic diagrams of a striker and a shoulder webbing;

FIG. 3F is a schematic diagram showing the striker and shoulder webbing equivalent to those shown in FIG. 3A, which are used in a modification of the invention;

FIG. 5A is a schematic front view of the locking means;

FIGS. 5B to 5D are diagrams showing how the locking means performs latching;

DETAILED DESCRIPTION OF THE INVENTION

Embodiment 1

The embodiments of this invention will be described in detail, with reference to the accompanying drawings.

Figure 1A:
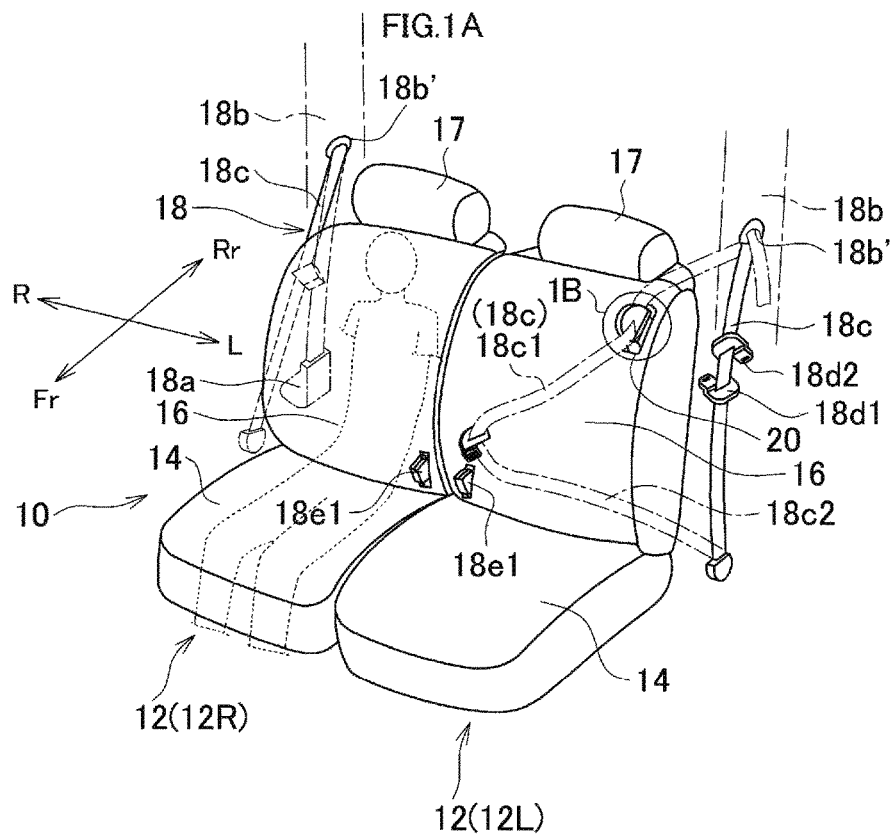
FIG. 1A is a schematic perspective view of a vehicle seat comprising a seat belt device according to one embodiment (Embodiment 1) of the present invention.

As shown in FIG. 1A, the vehicle seat 10 has two rear seats 12 (seats 12L and 12R) arranged side by side. Each of the left and right seats 12 (seats 12L and 12R) comprises a seat cushion 14 and a seatback 16. The seatback 16 is coupled to the seat cushion 14 and can be folded forward to the seat cushion. A headrest 17 is mounted on the top of the seatback 16.

In the drawings, arrows Fr and Rr indicate the forward and backward directions of the vehicle seat 10, and L and R indicate the leftward and rightward directions of the vehicle seat 10.

The seat cushion 14 and the seatback 16 have basic structures well known in the art. The seatback 16, for example, comprises a seatback frame and a seat pad 16a. The seatback frame is composed of left and right side frames and a connecting pipe connecting the upper ends of the left and right side frames, and is therefore shaped like letter U. (The right side frame 16c is shown in FIG. 2B.) As seen from FIG. 1C, the seat pad 16a made of foamed material such as urethane foam is mounted on the seatback frame and is covered with a trim cover 16b having air permeability. Similarly, the seat cushion 14 comprises a seat cushion frame, a seat pad (16a, shown in FIG. 1C), and a trim cover (16b, shown in FIG. 1C.). The seat cushion frame is composed of left and right side frames and a connecting pipe connecting the front parts of the left and right side frames, and is therefore shaped like letter U. The seat pad (16a, shown in FIG. 1C) is mounted on the seat cushion frame and is covered with the trim cover (16b, shown in FIG. 1C.).

Either seat belt 18 is a three-point holding seat belt and comprises a webbing 18c. A retractor 18a is provided in the chassis pillar 18b. The retractor 18a has taken up the webbing 18c with a traction force, and stores the webbing 18c. The distal end of the webbing 18c extends from the retractor 18a, passing through the webbing feed port 18b' made in the pillar wall and located above the upper edge of the vehicle seat 10. On the intermediate part of the webbing 18c that extends from the webbing feed port 18b', first and second tongues 18d1 and 18d2 are mounted and can freely slide.

Hereinafter, reference number 18c indicates the shoulder webbing 18c1, unless otherwise specified.

Buckles (first buckles) 18e1 are provided, respectively close to the center parts of the seat backs of the left and right rear seats 12 (12L and 12R). Each buckle 18e1 has, for example, one part embedded in the associated rear seat. The first tongues 18d1 is inserted in the first buckle 18e1 and engaged therewith.

In this invention, the upper-front part 16F of each seatback is cut, providing a hole 20, which may be positioned at the tip of the occupant's shoulder. In Embodiment 1, the hole 20 is a bottomed hole, but is not limited the bottomed hole and a through hole may be used as the hole.

The shoulder webbing 18c is set in engagement with an engaging means 30 provided in the hole 20, and is wrapped slantwise around the occupant from the occupant's shoulder to the buckle 18e1 provided at one side of the seat cushion.

Figure 1B:
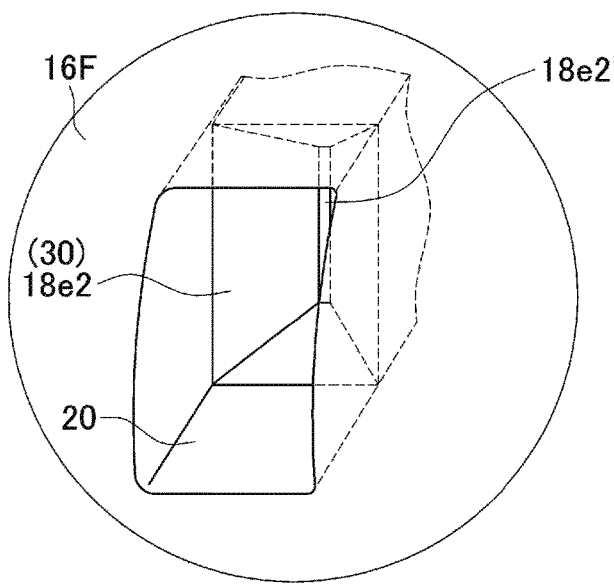
FIG. 1B is a partly magnified view, showing part 1B illustrated in FIG. 1A, and not showing the shoulder webbing for simplicity of drawing.

As shown in FIGS. 1A and 1B, the engaging means 30 is another buckle (second buckle) 18e2 arranged in the hole 20, and the second tongue (intermediate tongue) 18d2 mounted on the shoulder webbing 18c is inserted into the second buckle and engaged therewith.

Figure 1C:
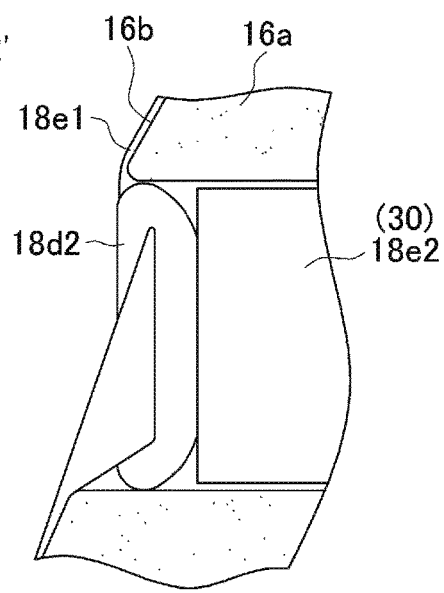
FIG. 1C is a partly sectional view of the part 1B illustrated in FIG. 1A, taken along the front-rear direction.

As seen well from not only FIGS. 1A and 1B, but also FIG. 1C, the seat pad (seatback member) 16a made of, for example, foamed urethane, is covered with the trim cover 16b. The seat pad (seatback member) 16a is cut, providing the hole 20 in the upper-front part of the seatback. The hole 20 opens at front and has a cross section shaped like a rectangle.

As shown in FIGS. 1B and 1C, the second buckle 18e2 is arranged and embedded in the hole 20 and has an engaging port 18e2' extending in vertical direction and opening at front. The second buckle 18e2 is spaced apart from the front 16F of the seatback, and is arranged and embedded in the hole 20 (thus, in the seatback).

The shape and structure of the second buckle 18e2 are not limited to those specified above. Rather, the second buckle 18e2 may be embedded in the hole 20, with the engaging port 18e2' of the second buckle orientated slantwise and upward, so that it may easily catch the second tongue (intermediate tongue) 18d2. Further, the second buckle 18e2 may not be embedded and immovably fitted in the hole 20, scarcely leaving a gap, as shown in FIGS. 1B and 1C. Instead, the second buckle 18e2 may rotate in the hole, around a rotation axle (not shown) provided in the hole. When the second buckle 18e2 may rotate in the hole 20 around a rotation axle, its orientation can be freely adjusted. This makes it easy to insert the second tongue 18d2 into the engaging port 18e2'.

The first buckle 18e1 and the second buckle 18e2 provided in the hole 20 have, for example, the same shape. Nonetheless, each buckle may be changed in shape in accordance with, for example, the size of the seat To wrap the shoulder webbing 18c around the occupant, he or she first hold the two tongues 18d1 and 18d2 with hands, then pulls the shoulder webbing from the webbing feed port 18b'. Then, the occupant inserts the second tongue 18d2 into the engaging port 18e2' of the second buckle provided in the hole 20. As a result, the shoulder webbing 18c is engaged.

As shown in FIGS. 1B and 1C, the shoulder webbing 18c is wrapped around the occupant, with its widthwise direction aligned with the left-right direction. By contrast, the second buckle 18e2 is embedded in the hole 20, and its engaging port 18e2' extends in the vertical direction. The shoulder webbing 18c is therefore twisted as shown in FIG. 1C, and its widthwise direction is therefore changed from the left-right direction to the vertical direction. The second tongue 18d2 is thereby inserted into the engaging port 18e2'. If the buckle 18e2 is embedded in the hole 20 so that the engaging port 18e2' may extend in the left-right direction, however, the second tongue 18d2 can be inserted into the engaging port without twisting the shoulder webbing 18c.

The occupant may pull the shoulder webbing 18c after it has engaged with the engaging means 30 (i.e., buckle 18e2), and insert the first tongue 18d1 into the first buckle 18e1. The upper half 18c1 of the webbing as the shoulder webbing is thereby wrapped around the occupant, slantwise from the occupant's left shoulder. At the same time, the lower half 18c2 of the webbing as the wrap webbing is wrapped around the occupant's hips, holding the occupant to one seat of the vehicle seat 10.

In this invention, the shoulder webbing 18c is wrapped around the occupant, after set into engagement with the engaging means 30 (i.e., buckle 18e2) which is held in the hole 20 made in the upper-front part 16F and which is located at the occupant's shoulder. Since the shoulder webbing 18c extends from the occupant's shoulder, a gap is scarcely provided between the occupant's shoulder and the shoulder webbing and front of the seat back. Therefore, the retractor 18a can tighten the shoulder webbing 18c in the case of emergency, immediately holding the occupant to the vehicle seat even if the occupant is small in physique. The seat belt can thus control the submarine phenomenon.

If the occupant has ordinary physique, the engaging means 30 held in the hole is not used at all, and either the tongue 18d1 or the tongue 18d2 is set into engagement with the buckle 18e1 as in the seat belt device well known in the art. That is, if the occupant has ordinary physique, it suffices to wrap the shoulder webbing 18c around the occupant, without setting the shoulder webbing 18c into engagement with the engaging means 30. In this case, too, the retractor 18a can tighten the shoulder webbing 18c in emergency, to hold the occupant to the vehicle seat in the same manner as usual. Needless to say, the engaging means, which is provided in the hole, would not contact, for example, the back of the occupant, not preventing the occupant from being well seated, even if the occupant has ordinary physique.

As described above, the second buckle 18e2 (engaging means 30) is embedded in the hole 20 made by cutting the upper-front part 16F of the seatback, and the second tongue (intermediate tongue) 18d2 able to engage with the second buckle is provided on the shoulder webbing 18c. These configuration features can instantly hold the occupant to the vehicle seat in emergency, reducing the gap between the webbing and the occupant. It is therefore unnecessary to use any drive mechanism for moving the engaging means to an appropriate position in emergency, such as an electric drive mechanism or an inflator. This simplifies the structure of the seat belt device.

The second buckle 18e2 (engaging means 30) is embedded in the hole 20 and does not protrude from the front of the seatback. The engaging means (second buckle) never contacts the back of the occupant, and would not prevent the occupant from being well seated. As long as the second buckle 18e2 remains well embedded in the hole 20, the second tongue 18d2 will not protrude from the front of the seatback even if it is inserted in the engaging port 18e2' of the second buckle. Hence, the second tongue never contact the back of the occupant seated, and the occupant wrapped with the shoulder webbing 18c is never prevented from being well seated.

Embodiment 2

Embodiment 2 shown in FIGS. 2A to 2C will be described. The components identical to those of the embodiment described above (Embodiment 1) are designated by the same reference numbers, and will not be described. The components distinguishing Embodiment 2 form Embodiment 1 will be described in the main.

Embodiment 2 differs from Embodiment 1 in that a striker is embedded in the hole 20, not the buckle 18e2 as in Embodiment 1.

In Embodiment 2, the striker 32 is shaped as a cantilever, and its inner end (close to the vertical centerline of the seat) is the free end. The striker 32 shaped like a cantilever extends in the hole in the left-right direction from, for example, the outer side 20S (pillar-side) of the hole. The distal end (inner end) of the striker is a free end, and spaced from the inner side 20S' of the hole. A part of the striker, for example the middle part 32 b, is bent twice, forming a stepped part. In FIGS. 2B and 2C, the hole 20 is shown as a bottomed hole. However, in Embodiment 2, the hole 20 is not limited to a bottomed hole and a through hole may be used as the hole.

The shoulder webbing 18c is bent back at the intermediate part, and is substantially U-shaped. The part of the shoulder webbing, so bent back, is engaged with the striker 32 provided in the hole 20. As a result, the shoulder webbing is wrapped slantwise around the occupant's shoulder.

FIGS. 3A to 3E and FIG. 3F show a modification of Embodiment 2. In order to engage the shoulder webbing 18c with the striker 32 shown in FIG. 3A, the free end 32a is pushed rearwards (see FIG. 3B). Then, the part of the shoulder webbing 18c, bent back as describe above, is passed first through the gap between the free end 32a and the inner side 20S' of the hole, is inserted, and guided through the striker 32 (see FIG. 3C).

After guided to the striker 32, first at the free end 32a thereof, the shoulder webbing 18c is pushed onto the middle part 32b of the striker 32 (see FIG. 3D). When the force is released from the free end 32a of the striker, the striker returns to the initial position shown in FIG. 3A, because of its resilient force (see FIG. 3E).

The bent-back part of the shoulder webbing 18c may be inserted and engaged with the striker 32 as the engaging means 30, and the shoulder webbing 18c may then be wrapped slantwise around the occupant's shoulder. Then, a gap is scarcely provided between the shoulder webbing and the occupant's shoulder and seatback, in the same way as in Embodiment 1. The shoulder webbing 18c can therefore be tightened in emergency, holding the occupant to the vehicle seat even if the occupant is small in physique. The seat belt can thus control the submarine phenomenon.

Further, it suffices to provide the striker 32 in the hole 20 and guide the bent-back part of the shoulder webbing 18c through the striker. This helps to simplify the structure of the configuration of the seat belt device. Needless to say, the striker 32, which is provided in the hole, would not prevent the occupant from being well seated, even if the occupant has ordinary physique. When the shoulder webbing is wrapped around the occupant's shoulder, without being engaged with the engaging means 30 (striker 32), the occupant can be held well to the vehicle seat and submarine phenomenon can be controlled. The striker 32 never prevents an occupant of ordinary physique, as well as an occupant of small physique, from being seated well in the vehicle seat.

The striker may be bent twice at middle part 32b as shown in FIGS. 3A to 3F, to have a stepped part. Then, the striker can therefore catch the shoulder webbing 18c at bent-back part more easily than otherwise, and can prevent the shoulder webbing from slipping sideways.

Further, the free end 32a of the striker may be bent as shown in FIG. 3F. In this case, the striker can reliably prevent the shoulder webbing 18c from slipping sideways and falling down from the free end of the striker.

As seen from FIG. 3B, the free end 32a of the striker is bent backwards. Instead, the free end of the striker may be bent forwards and may guide the shoulder webbing 18c.

Further, the free end 32*a* of the striker may not be bent forwards, the bent-back part of the shoulder webbing 18*c* may be passed through the gap between the free end and the inner side 20S' of the hole, and may then be guided by the striker.

As shown in FIGS. 2B and 3A, the striker 32 extends from the pillar-side 20S of the hole in the left-right direction. Instead, the fixed end 32*c* of the striker may be secured to a locking means 40 (more precisely, bracket 49 described later) configured to lock the seatback in a standing position. Alternatively, the locking means may be used as striker. Still alternatively, the fixed end 32*c* of the striker may be secured to one side frame (i.e., the right side frame 16*c*) of the seatback frame.

Figure 4A:
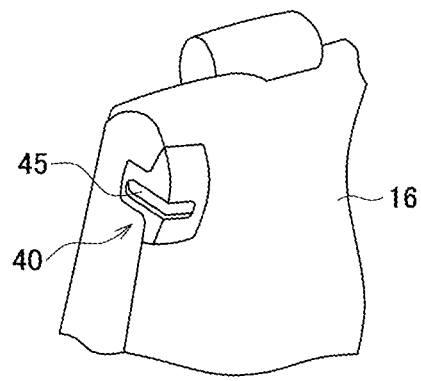
FIGS. 4A and 4B are a partly rear perspective view and a partly schematic plan view, respectively, of a vehicle seat, illustrating a modification of this invention.
Figure 4B:
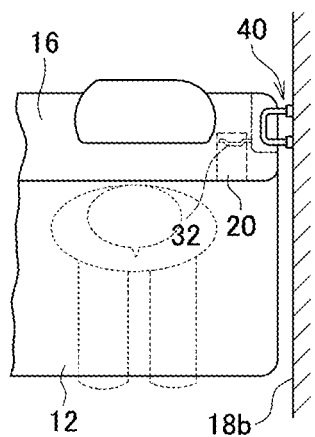
Figure 4C:
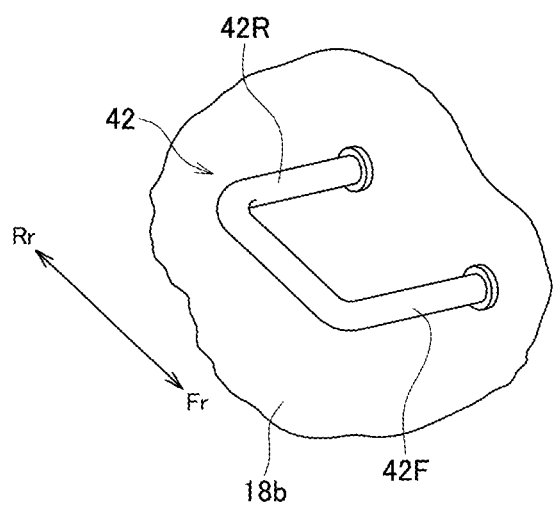
FIG. 4C is a partly perspective view of a gate-shaped striker.

As shown in FIGS. 4A and 4B, the locking means 40 has such a known configuration as shown in FIGS. 3A to 5F appended to JP 2011-162163A that is a patent application filed by the applicant hereof. In brief, the locking means 40 has, for example, a gate-shaped striker 42 and a latch 44. The latch 44 can rotate to come into engagement with the striker 42. Once the latch 44 has been engaged with the striker 42, the seatback 16 is fixed in the standing position. The latch 44 of the locking means is provided at an upper part of one side of the seatback 16. The gate-shaped striker 42 is secured to the pillar 18*b* opposing the latch 44. The gate-shaped striker 42 has two legs (front leg 42F and rear leg 42R), and is shaped like letter U.

The latch 44 of the locking means 40 is clamped between a base plate 46 and a cover plate 48, forming a unit together with the plates 46 and 48. The unit has a bracket 49 formed integral. The bracket is secured to the frame of the seatback 16 (i.e., seatback frame). The latch 44 of the locking means is thereby attached to the upper part of one side of the seatback.

The fixed end 32*c* of the striker is connected to the bracket 49, and is secured thereto.

A shaft 44S extends between the base plate 46 and the cover plate 48. The latch 44 is provided between the base plate and the cover plate and can rotate around the shaft 44S. A biasing means such as a torsion spring (not shown) is wound around, for example, the shaft 44S, and applies a force F to the latch 44, biasing the latch 44 to rotate clockwise around the shaft 44S as indicate by an arrow shown in FIG. 5A. The latch 44 is thereby set in at an initial position.

The gate-shaped striker 42 is secured to the pillar 18*b*, with the front leg 42F and rear leg 42R positioned in the locus of a slit 45 located at the standing position of the seatback.

How the latch of the locking means operates as the seatback assumes its standing position is well known in the art. The operation of the latch will therefore be briefly explained. As the seatback 16 is rotated to the standing position, the slit 45 of the locking means moves along a locus 45' shown in FIG. 5B. In the locus 45' of the slit 45, the front leg 42F and rear leg 42R of the gate-shaped striker are positioned. When the front leg 42F slips into the slit 45, the first face 44*a*1 of the latch 44, which extends across the slit, abuts on the front leg (see FIG. 5B). The first face 44*a*1 is a slope curved like an arc. Therefore, the latch 44 rotates against the bias force F, moving away from the front leg (as seen in the direction of the arrow shown in FIG. 5C), as the front leg 42F is guided, sliding on the first face.

The front leg 42F moves from the first face 44*a*1 to the second face 44*a*2 of the latch 44 and abuts on the second face 44*a*2. The front leg 42F then slides on the second face 44*a*2 that is a slope curved like an arc, similar to the first face 44*a*1. Meanwhile, the latch 44 further rotates against the bias force F, moving away from the front leg. When the front leg 42F moves over beyond the second face 44*a*2, slipping into a storage space 44*c*, the rear leg 42R slides on the first face 44*a*1, moves beyond the first face and is held in a locking groove 44*b* (see FIG. 5D). As a result, the seatback 16 is held in its standing position.

The bracket 49 of the locking means 40 connects the fixed end 32*c* of the striker to the latch 44. The striker 32 is therefore stably secured, by the locking means 40 (bracket 49), to the gate-shaped striker 42 and the pillar 18*b* when the seatback 16 is rotated to its standing position.

In emergency, an inertial force acts, via the striker 32 (engaging means 30), on the occupant wearing the shoulder webbing 18*c*, to move the occupant forwards. The inertial force is transmitted to the striker through the shoulder webbing. The inertial force generated in emergency escapes to the locking means 40 via the bracket if the fixed end 32*c* of the striker is connected and secured to the bracket 49.

The gate-shaped striker 42 may be secured to the bracket 49 (latch 44) in any other manner. For example, the fixed end 32*c* of the striker is secured to the pillar 18*b*, and the gate-shaped striker 42 is secure to the bracket 49 (latch 44) provided on the upper part of one side of the seatback. Alternatively, the gate-shaped striker 42 or latch 44 provided on the seatback may be connected to one side frame (i.e., the right side frame 16*c*) of the seatback frame. If connected to one side frame of the seatback frame, the striker 42 or latch 44 is stably fixed and can therefore transmit the inertial force generated in emergency to the side frame.

Any shaft secured at a specific position and extending in the left-right direction, for example the shaft 44S of the latch 44, may be utilized as striker. Further, the fixed end 32*c* of the striker may be fixed to one side frame of the seatback frame.

Embodiment 3

Figure 6A:
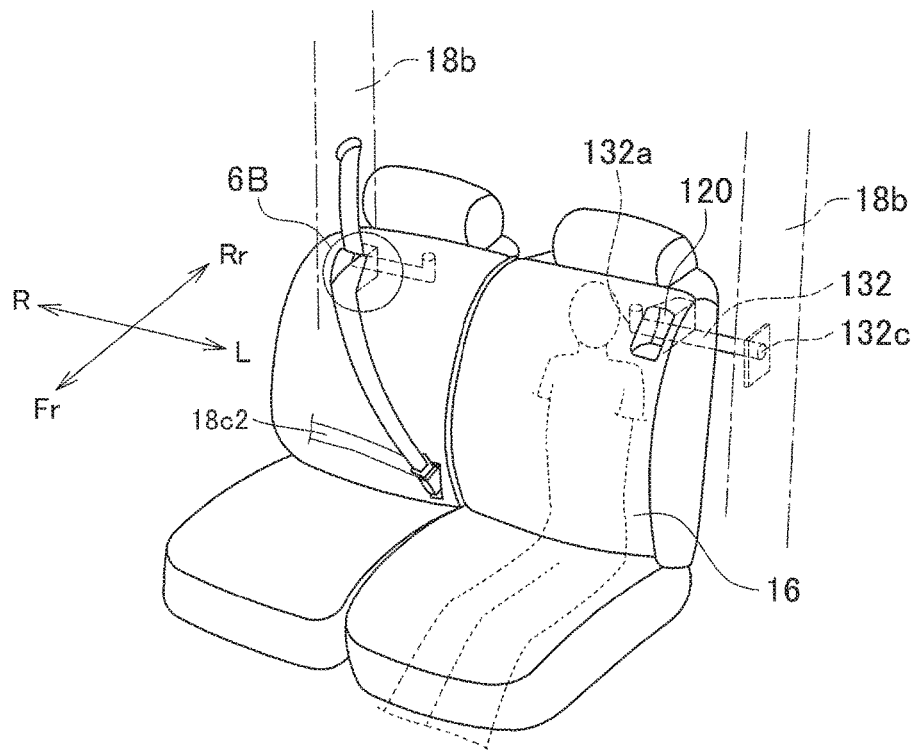
FIG. 6A is a schematic perspective view of a vehicle seat comprising a seat belt device according to other embodiment (Embodiment 3) of the present invention, not showing the wrap webbing for simplicity of drawing.
Figure 6B:
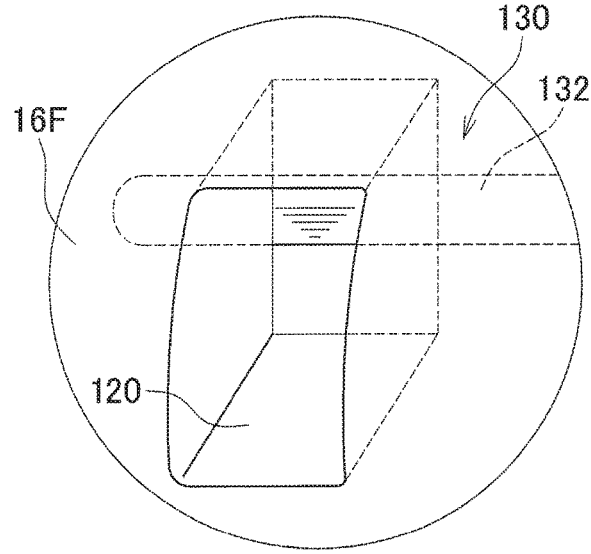
FIG. 6B is a partly magnified view, showing part 6B illustrated in FIG. 6A, and not showing the shoulder webbing for simplicity of drawing.
Figure 6C:
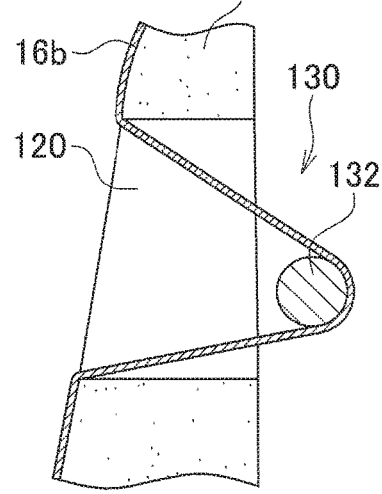
FIG. 6C is a partly sectional schematic view of the part 6B illustrated in FIG. 6A.

FIGS. 6A to 6C show Embodiment 3 of this invention. The components identical to those of the embodiments described above (Embodiments 1 and 2) are designated by the same reference numbers, and will not be described. The components distinguishing Embodiment 3 from Embodiments 1 and 2 will be described in the main.

In Embodiments 1 and 2, a hole is made by cutting an upper-front part of the seatback. In Embodiment 3, a hole is made by cutting through an upper-front part of the seatback. Further, in Embodiment 1 the engaging means is the second buckle located in the hole (bottomed hole or through hole), and in Embodiment 2 the striker located in the hole (through hole or bottomed hole). In Embodiment 3, the engaging means is the striker arranged at the back of the hole (through hole). Embodiment 3 differs in these respects from Embodiments 1 and 2.

In Embodiment 3, a hole (through hole) 120 is cut through the upper-front part 16F of the seatback and may be positioned at the occupant's shoulder, and an engaging means 130 is spaced from the back of the seatback. The hole 120 has a cross section shaped like a rectangle. The shape of the cross section is not limited, nonetheless, so long as the shoulder webbing can pass through the hole.

The engaging means 130 is a striker 132 shaped like a cantilever, and its inner end (i.e., inner side of the seat) is the free end. As seen from FIGS. 6A and 6B, the striker 132 has a fixed end 132*c* on the surface of a pillar 18*b* at the back of the hole 120, and extends toward the seat from the pillar.

As seen from FIG. 6A, the free end 132a of the striker is bent upwards, for example. The shape of the free end 132a is not limited to this, nonetheless. If so bent, however, the free end 132a can prevent the shoulder webbing 18c from slipping sideways on the striker 132 or falling from the free end 132a. Alternatively, as shown in FIG. 3A, the middle part of the striker 132 may be bent twice at its middle part to have a stepped part. In this case, too, the shoulder webbing 18c can be prevented from slipping sideways or falling down. Still alternatively, the free end 132a of the striker may be bent back as shown in FIG. 3F.

Figure 7:
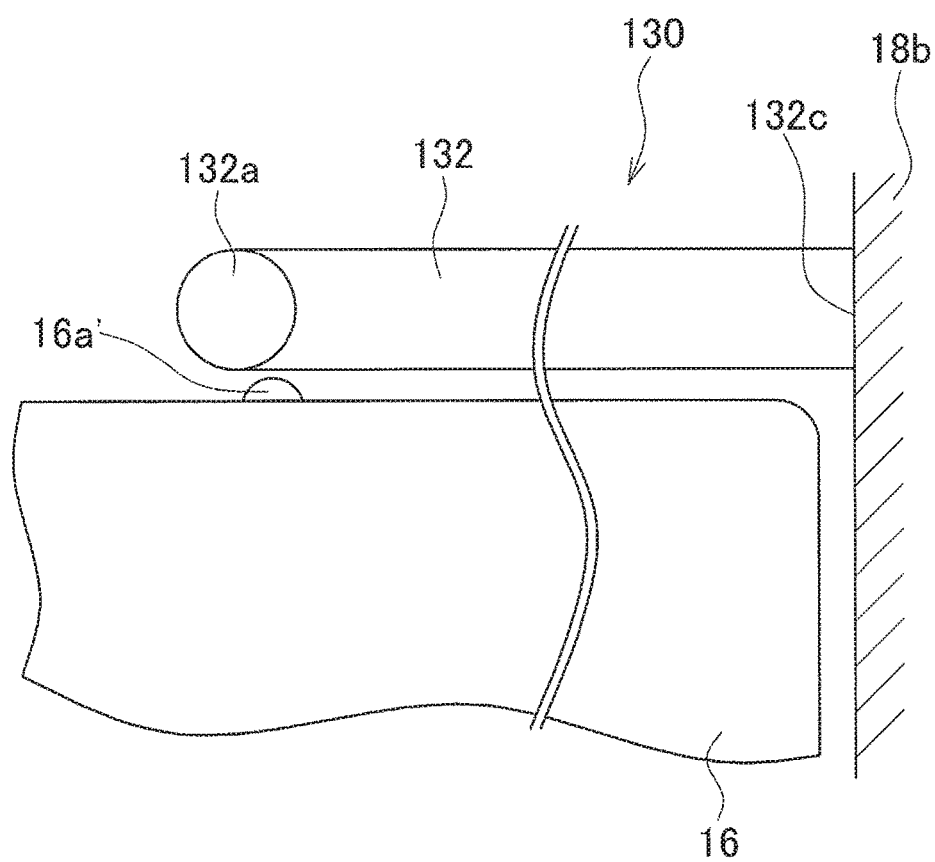
FIG. 7 is a partly schematic plan view of a vehicle seat comprising a striker and a stay.

As shown in FIG. 7, a support 16a' may be provided on the back of the seatback, thereby to support the striker 132 as it is deformed (bent) toward the back of the seatback. The support 16a' is mounted on the back of the seatback and located in front of the free end 132a of the striker and is made of, for example, elastic material and is semispherical in shape.

How the engaging means 130 (striker 132) shown in FIGS. 6A to 6C operates will be explained. As shown in FIG. 6C, a part of the shoulder webbing 18c is bent back at the intermediated part and is substantially U-shaped. The part so bent is guided from the free end 132a of the striker through the hole 120 and is engaged with the striker 132. So engaged by the engaging means 130, the shoulder webbing 18c is wrapped slantwise around the occupant, from the occupant's shoulder to the buckle 18e1 provided on one side of the seat cushion.

The engaging means 130 is the striker 132 provided at the back of the hole 120. Despite this, Embodiment 3 can achieve the same technical advantage as in Embodiments 1 and 2, i.e., to reduce the gap between the shoulder webbing 18c and the occupant's shoulder. This is because the shoulder webbing 18c is first engaged with the engaging means 130 (striker 132) and then wrapped slantwise around the occupant's shoulder. Hence, the shoulder webbing 18c can be instantaneously tightened in emergency and control submarine phenomenon even if the occupant has small physique.

It suffices to make a hole 120 in the upper-front part 16F of the seatback and to provide the striker 132 at the back of the hole 120. This helps to simplify the configuration of the seat belt device. Needless to say, the striker 132, which is provided at the back of the hole 120, would not prevent the occupant from being well seated.

If the occupant has ordinary physique, the shoulder webbing may be wrapped around the shoulder, without being engaged with the engaging means (striker 132). In this case, the shoulder webbing is tightened in emergency, holding the occupant well to the vehicle seat and hence preventing the submarine phenomenon. Thus, the striker 132 never prevents an occupant of ordinary physique, as well as an occupant of small physique, from being seated well in the vehicle seat.

As shown in FIGS. 6A to 6C, the striker 132 extends from the pillar 18b (more precisely, from the surface thereof). The inertial force acting on the occupant in emergency is therefore transmitted through the shoulder webbing 18c to the striker. If the fixed end 132c of the striker is secured to the pillar 18b, the inertial force escapes to the pillar through the striker.

The striker 132 is spaced from the back of the seatback. If the back of the seatback has a horizontal hole communicating with the hole 120 and the striker 132 extends in the horizontal hole, the striker is embedded in the horizontal hole, not exposed at all. This prevents the vehicle seat from being degraded in outer appearance.

As described above, the seat belt device according to this invention can hold even an occupant of small physique to the vehicle seat in emergency, thereby to control the submarine phenomenon, without using any additional components. If the occupant has ordinary physique, he or she only needs to wrap the shoulder webbing around him or her, without engaging the shoulder webbing with the engaging means. Needless to say, the seat belt device can hold the occupant of ordinary physique, too, to the vehicle seat in emergency, thereby to control the submarine phenomenon.

Some embodiments describe have been described to explain this invention, and are not intended to limit the scope of the invention. Accordingly, various changes and modifications may be made within the spirit or scope of this invention, and are of course included in this invention.

The use of this invention is not limited to vehicle seats in buses and automobiles. The invention can be applied also to train seats and airplane seats, to pull the seat-belt webbing in emergency, thereby to control the submarine phenomenon.

What is claimed is:

1. A seat belt device for vehicle seats, comprising a webbing having a tongue and extending from a webbing feed port made in a pillar, when the tongue is inserted into a buckle provided on one side of a seat cushion, the upper half of the webbing used as a shoulder webbing is wrapped slantwise around the shoulder of the occupant sitting on the vehicle seat, and the lower half of the webbing used as a wrap webbing is wrapped around the hips of the occupant, thereby holding the occupant to the vehicle seat, wherein further comprising:
   a hole provided by cutting the seatback at an upper-front part and located at a position where the shoulder of the occupant lies; and
   a striker shaped as a cantilever provided in the hole and having a free end at an inner end, and the shoulder webbing is bent back, forming a bent part at the intermediated part and is substantially U-shaped, and is wrapped slantwise around the shoulder of the occupant, at the bent part engaged with the striker.

2. The seat belt device according to claim 1, wherein the striker is secured to one side frame of a seatback frame.

3. The seat belt device according to claim 1, wherein a gate-shaped striker and a latch are provided between the seatback and the pillar,
   the latch is structured to engage with the gate-shaped striker, and
   the gate-shaped striker and the latch are structured to hold the seatback at a standing position while the latch remains engaged with the gate-shaped striker;
   the striker shaped as a cantilever is connected to the gate-shaped striker or the latch and has the free end extending along a centerline of the seat.

4. The seat belt device according to claim 1, wherein the striker shaped as a cantilever is bent twice at middle part, forming a stepped part which prevents the shoulder webbing from slipping sideways.

5. The seat belt device according to claim 1, wherein the free end of the striker shaped as a cantilever is bent, preventing the shoulder webbing from slipping sideways.

6. The seat belt device according to claim 2, wherein a gate-shaped striker and a latch are provided between the seatback and the pillar:
   the is latch structured to engage with the gate-shaped striker, and the gate-shaped striker and the latch are structured to hold the seatback at a standing position while the latch remains engaged with the gate-shaped striker;

the striker shaped as a cantilever is connected to the gate-shaped striker or the latch and has the free end extending along a centerline of the seat.

7. The seat belt device according to claim 2, wherein the striker shaped as a cantilever is bent twice at middle part, forming a stepped part which prevents the shoulder webbing from slipping sideways.

8. The seat belt device according to claim 2, wherein the free end of the striker shaped as a cantilever is bent, preventing the shoulder webbing from slipping sideways.

9. The seat belt device according to claim 3, wherein the gate-shaped striker or the latch, provided on the seatback, is connected to one side frame of the seatback frame.

10. The seat belt device according to claim 3, wherein the striker shaped as a cantilever is bent twice at middle part, forming a stepped part which prevents the shoulder webbing from slipping sideways.

11. The seat belt device according to claim 3, wherein the free end of the striker shaped as a cantilever is bent, preventing the shoulder webbing from slipping sideways.

12. The seat belt device according to claim 6, wherein the gate-shaped striker or the latch, provided on the seatback, is connected to one side frame of the seatback frame.

13. The seat belt device according to claim 6, wherein the striker shaped as a cantilever is bent twice at middle part, forming a stepped part which prevents the shoulder webbing from slipping sideways.

14. The seat belt device according to claim 6, wherein the free end of the striker shaped as a cantilever is bent, preventing the shoulder webbing from slipping sideways.

* * * * *